(12) United States Patent
Methley et al.

(10) Patent No.: US 10,519,821 B2
(45) Date of Patent: Dec. 31, 2019

(54) ENGINE VALVE SYSTEM

(71) Applicant: MECHADYNE INTERNATIONAL LTD., Kirtlington, Oxfordshire (GB)

(72) Inventors: Ian Methley, Witney Ox (GB); Timothy Mark Lancefield, Shipston on Stour (GB); Mark Walton, Brackley (GB); Kyle Webb, Abingdon (GB)

(73) Assignee: MECHADYNE INTERNATIONAL LTD., Kirtlington, Oxfordshire (GB)

( * ) Notice: Subject to any disclaimer, the term of this patent is extended or adjusted under 35 U.S.C. 154(b) by 0 days.

(21) Appl. No.: 16/332,358

(22) PCT Filed: Sep. 13, 2017

(86) PCT No.: PCT/EP2017/073018
§ 371 (c)(1),
(2) Date: Mar. 12, 2019

(87) PCT Pub. No.: WO2018/050694
PCT Pub. Date: Mar. 22, 2018

(65) Prior Publication Data
US 2019/0360369 A1 Nov. 28, 2019

(30) Foreign Application Priority Data
Sep. 14, 2016 (EP) .................................... 16188756

(51) Int. Cl.
*F01L 1/34* (2006.01)
*F01L 13/00* (2006.01)
(Continued)

(52) U.S. Cl.
CPC ........... *F01L 13/0047* (2013.01); *F01L 1/185* (2013.01); *F01L 1/2405* (2013.01); *G01M 15/06* (2013.01);
(Continued)

(58) Field of Classification Search
CPC ..... F01L 13/0047; F01L 1/185; F01L 1/2405; F01L 2105/00; F01L 2800/17; F01L 2800/18; G01M 15/06
See application file for complete search history.

(56) References Cited

U.S. PATENT DOCUMENTS

| 5,373,818 A | 12/1994 | Unger |
| 2010/0294222 A1* | 11/2010 | Methley .................... F01L 1/18 123/90.16 |
| 2012/0160200 A1 | 6/2012 | Methley et al. |

FOREIGN PATENT DOCUMENTS

| DE | 37 25 448 A1 | 2/1989 |
| EP | 2 475 848 A2 | 7/2012 |
| JP | 2010-19118 A | 1/2010 |

* cited by examiner

*Primary Examiner* — Zelalem Eshete
(74) *Attorney, Agent, or Firm* — Norman B. Thot

(57) ABSTRACT

A valve system for an engine includes two cams each having a follower, a summation lever coupled to the followers, a lash adjuster, a valve actuating rocker pivotably coupled to the summation lever and resting on the lash adjuster, a control spring urging the summation lever to compress the lash adjuster, a stop limiting an expansion of the control spring, a bore, a plunger which moves in the bore, and an abutment surface. The control spring acts on the summation lever via the plunger. A plunger end engages with the summation lever. A point of contact between the plunger and the summation lever is displaced in a direction transverse to a plunger axis during a pivoting movement of the summation lever. A plunger shoulder is arranged a distance from the plunger end to contact the abutment surface to limit a plunger displacement in a direction compressing the lash adjuster.

18 Claims, 4 Drawing Sheets

(51) Int. Cl.
*F01L 1/24* (2006.01)
*F01L 1/18* (2006.01)
*G01M 15/06* (2006.01)

(52) U.S. Cl.
CPC ....... *F01L 2105/00* (2013.01); *F01L 2800/17* (2013.01); *F01L 2800/18* (2013.01)

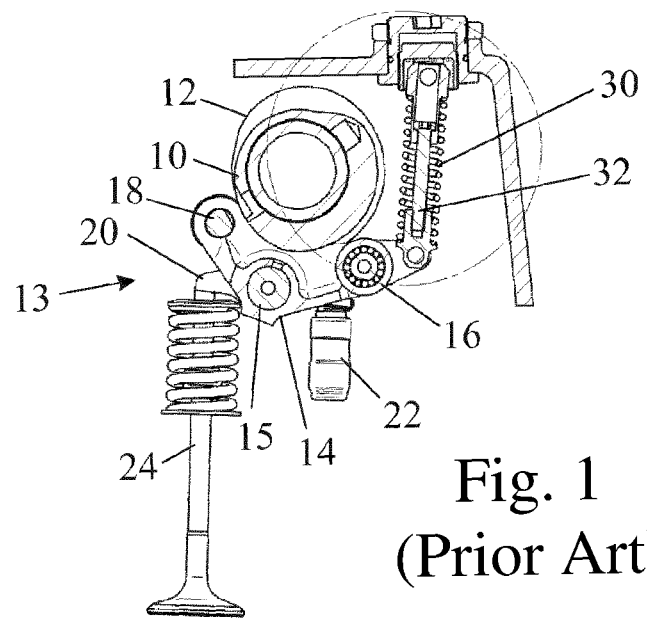
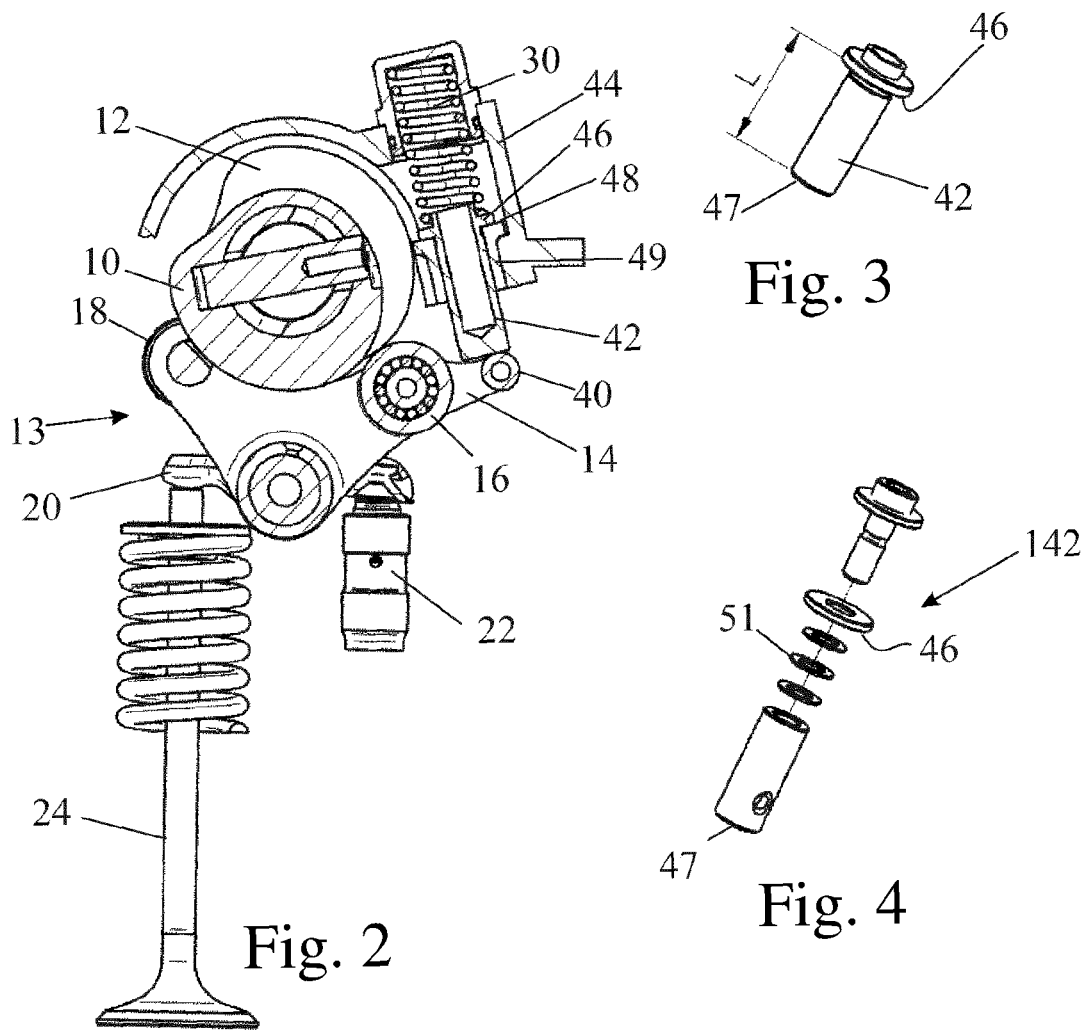
Fig. 1 (Prior Art)
Fig. 3
Fig. 2
Fig. 4

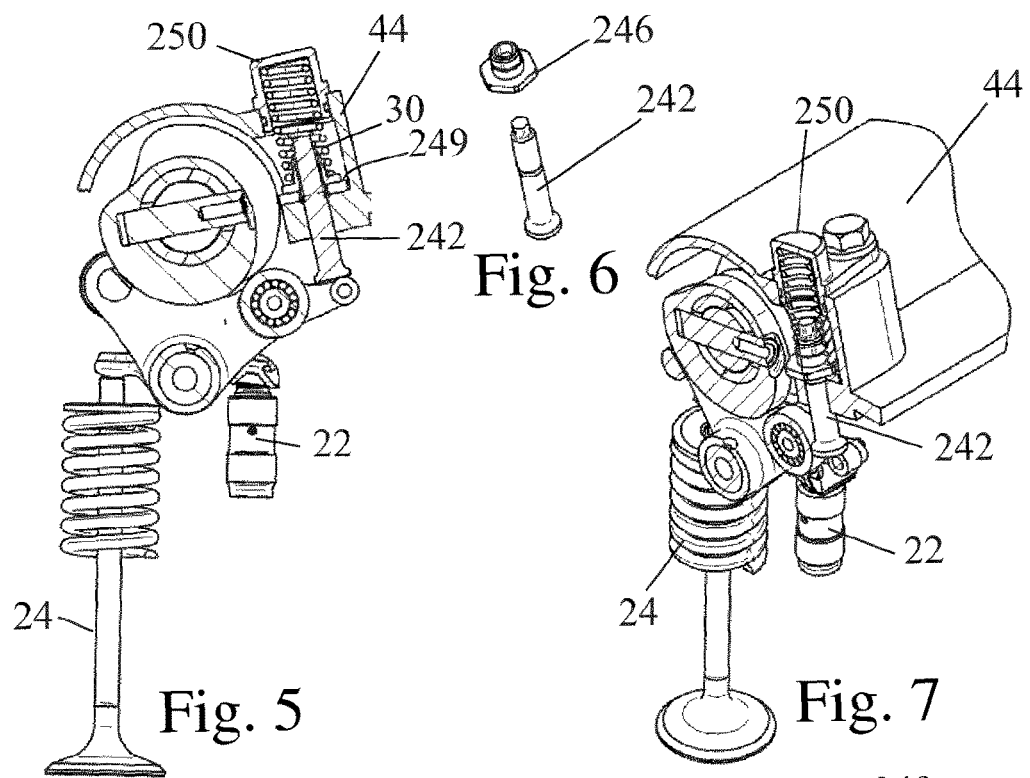
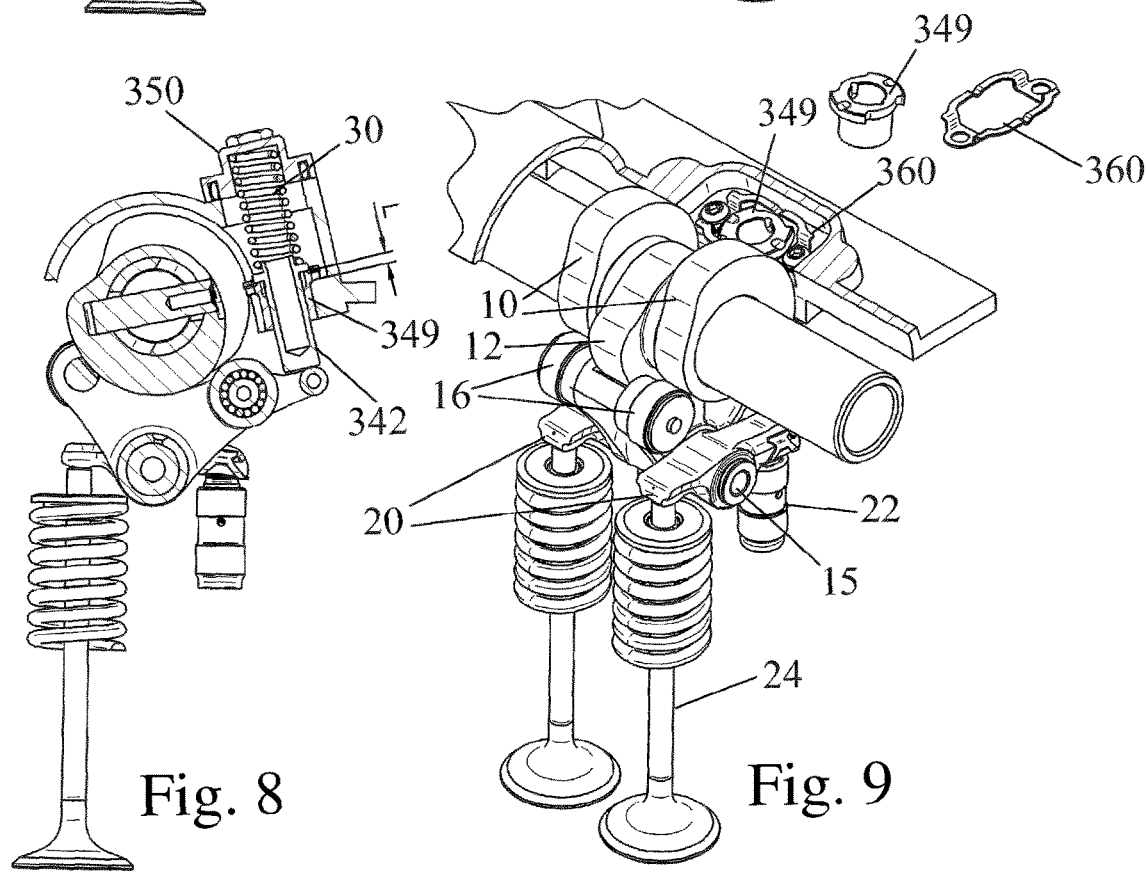

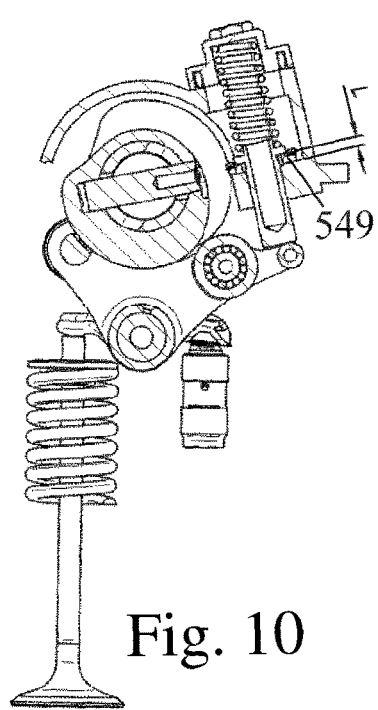
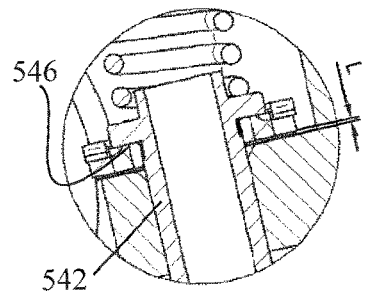
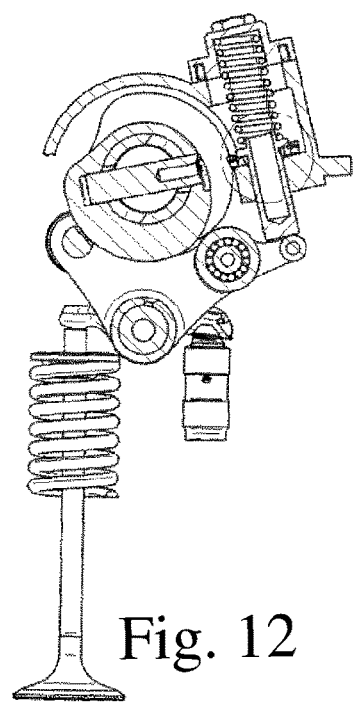
Fig. 10    Fig. 11    Fig. 12
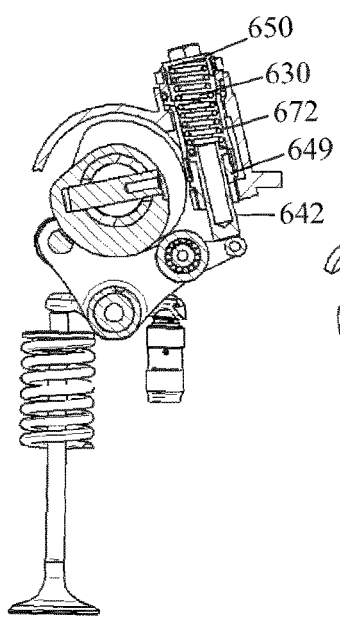
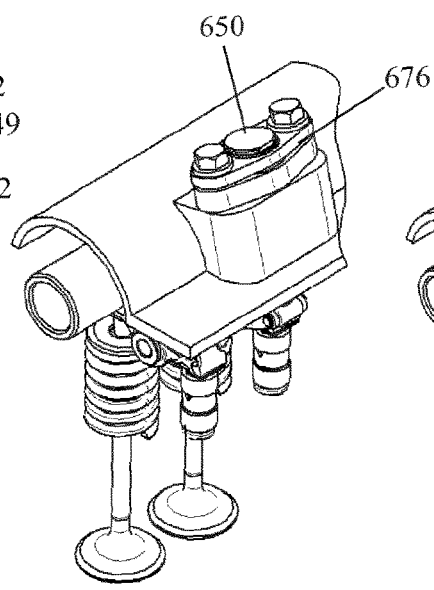
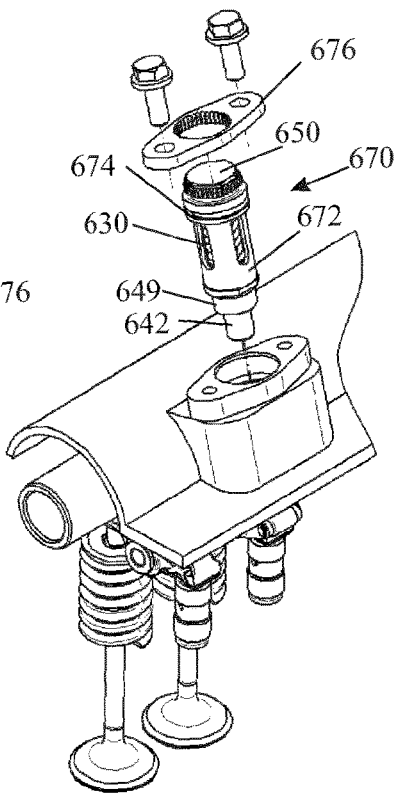
Fig. 13    Fig. 14    Fig. 15

1

ENGINE VALVE SYSTEM

CROSS REFERENCE TO PRIOR APPLICATIONS

This application is a U.S. National Phase application under 35 U.S.C. § 371 of International Application No. PCT/EP2017/073018, filed on Sep. 13, 2017 and which claims benefit to European Patent Application No. 16188756.7, filed on Sep. 14, 2016. The International Application was published in English on Mar. 22, 2018 as WO 2018/050694 A1 under PCT Article 21(2).

FIELD

The present invention relates to an engine valve system that uses two cams to act on a valve by way of a summation mechanism to achieve variable valve event timing, event duration and valve lift.

BACKGROUND

FIG. 1 of the accompanying drawings corresponds to FIG. 6 of European Patent No. EP 2,475,848, the disclosure of which is incorporated by reference herein.

In FIG. 1, a valve 24 is operated by two cams 10 and 12 that act on the valve 24 by way of a summation mechanism, generally designated as 13. The summation mechanism 13 comprises a summation lever 14 having cam follower rollers 16 and 18 which respectively contact with cams 10, 12. In practice, one of the cams 12 is formed in two halves with the same profile that straddles the other cam 10. The summation lever 14 is mounted by way of a pivot pin 15 on an actuating rocker 20 of which one end contacts the tip of the valve 24 and the other end rests on a hydraulic lash adjuster 22.

The summation lever 14 is further acted upon by a control spring 30 that serves to rotate the summation lever 14 clockwise, as viewed, about its pivot pin 15 to oppose, and limit, the expansion of the hydraulic lash adjuster 22. A stop, in the form of a central rod 32, limits the expansion of the control spring 30 to set the system clearance when the cam follower rollers 16, 18 are on the base circles of their respective cams 10, 12. It should be explained that the central rod 32 contacts its stop when the control spring 30 is fully extended and this only occurs when the outer pair of cams is at its minimum lift (i.e., on the base circle). There can still be clearance in the system at other times in the cycle, such as when the central cam is on its base circle, but at that point the control spring 30 is still compressed and so the hydraulic lash adjuster 22 cannot expand as it is unable to overcome the force of the control spring 30.

In the prior art, the central rod 32 is pivotably connected at one end to the end of the summation lever 14 and at its other end it is connected to a stationary component of the engine, such as the cam cover, by an arrangement that allows the clearance to be set.

A disadvantage of the configuration in FIG. 1 is that it is difficult to assemble the valve system and to set the clearance in the system.

JP 2010 019118 describes an engine configuration intended to minimize the axial dimension of an internal combustion engine provided with a variable valve train. Camshafts and a lost motion spring are disposed in parallel in the cylinder axis direction and sub-locker arms are disposed at one side of the intake/exhaust direction of the camshafts and the lost motion spring.

DE 3725448 describes a two-armed adjusting lever (S) which is in constant contact with the running surfaces of two cams, differing in their lift and overall lift duration, and transmits the cam lifting movements by way of a pickup to the valve. Spring-loaded tappets increase the contact pressure of the adjusting lever on the cams. A rotation of the control shaft, the crank pin of which slides in the guide groove of the adjusting lever, displaces the axis of rotation of the adjusting lever and thereby adjusts the lever arm ratio between the lifting action points of the two cams and the axis of rotation. The share of the lift of each individual cam in the valve lift varies, resulting in a stepless variation of the maximum valve lift and the valve opening time. This allows the valve timing and valve timing cross-sections to be adjusted to the requirements of different engine speeds and loads in internal combustion engines.

An engine described in U.S. Pat. No. 5,373,818 comprises at least two inlet stroke valves per cylinder, the courses of the strokes of these stroke valves being adjustable in different manners. The adjustment takes place by means of an eccentric shaft which displaces the supporting point of a transfer element disposed between each cam and each stroke valve, in which case the two eccentrics assigned to one cylinder are of a different geometry. The transfer element is formed by a valve lever which is supported on the eccentric and is actuated by the cam, which valve lever, in turn, acts upon a rocker lever. The respective contact surfaces are formed by rollers. A further transfer element, which has a crank path, is also described.

SUMMARY

An aspect of the present invention is to provide an improved engine valve system that has two coaxially mounted cams acting on each valve by way of a summation mechanism and that has a hydraulic lash adjuster to maintain a desired clearance in the system when the valve is fully closed, yet that is simple to assemble and to adjust correctly.

In an embodiment, the present invention provides a valve system for an engine which comprises an engine block. The valve system includes two cams which are coaxially mounted, each of the two cams comprising a follower, a summation lever coupled to each follower of the two cams, a hydraulic lash adjuster, a valve actuating rocker arranged to be pivotably coupled to the summation lever and to rest on the hydraulic lash adjuster, a control spring configured to urge the summation lever in a direction to compress the hydraulic lash adjuster, a stop configured to limit an expansion of the control spring, a bore arranged to be stationary relative to the engine block, a plunger comprising a shoulder and an end, and an abutment surface arranged to be stationary relative to the engine block. The summation lever is configured to perform a pivoting movement and to be movable in proportion to a sum of an instantaneous lift of each of the two cams. The valve actuation rocker is configured to operatively displace an engine valve in dependence upon a movement of the summation lever. The plunger is arranged to reciprocate linearly within the bore. The control spring is further configured to act on the summation lever via the plunger. The end of the plunger is arranged to be in a sliding engagement with the summation lever. A point of contact between the plunger and the summation lever is displaced in a direction transverse to an axis of the plunger during the pivoting movement of the summation lever. The shoulder of the plunger is arranged at a predetermined distance from the end of the plunger. The shoulder is configured to contact the abutment surface to limit a displacement of the plunger in a direction to compress the hydraulic lash adjuster.

BRIEF DESCRIPTION OF THE DRAWINGS

The present invention will be described in greater detail below on the basis of embodiments and of the drawings in which:

FIG. 1 shows a prior art configuration for limiting the expansion of a hydraulic lash adjuster in a cam summation engine valve system;

FIG. 2 shows a section view similar to that of FIG. 1 showing a first embodiment of the present invention;

FIG. 3 shows a perspective view of the plunger in FIG. 2;

FIG. 4 shows an exploded view of an alternative construction of the plunger in FIG. 2;

FIG. 5 shows a section view similar to that of FIG. 2 showing a second embodiment of the present invention;

FIG. 6 shows a perspective view of the plunger in FIG. 5;

FIG. 7 shows a perspective cut-away view of the embodiment of FIGS. 5 and 6;

FIG. 8 shows a section view similar to that of FIG. 2 of a third embodiment of the present invention;

FIG. 9 shows a perspective view of a third embodiment of the present invention;

FIG. 10 shows an embodiment of the present invention;

FIG. 11 shows an embodiment of the present invention;

FIG. 12 shows part of FIG. 11 drawn to an enlarged scale;

FIG. 13 shows a section similar to that of FIG. 10 of a further embodiment of the present invention;

FIG. 14 shows an assembled view of the embodiment of FIG. 10;

FIG. 15 shows an exploded view of the embodiment of FIG. 10; and

DETAILED DESCRIPTION

Figure 16:
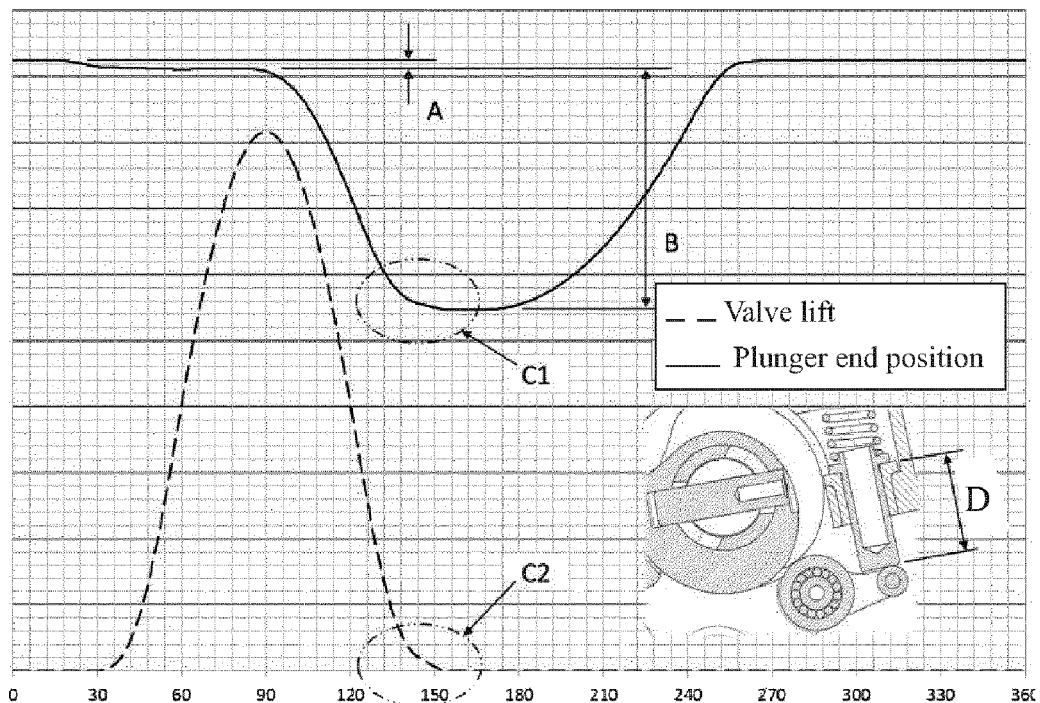
FIG. 16 shows a graph of valve lift and plunger displacement plotted against the camshaft angle.

In FIGS. 2 to 4, the summation mechanism comprising the summation lever 14, with its cam follower rollers 16 and 18, and the actuating rocker 20 are all the same as described with reference to FIG. 1, except that there is no element connected to the right hand end of the summation lever 14, as viewed in FIG. 1. A roller 40 is instead mounted on the end of the summation lever 14 which is engaged by the end surface of a plunger 42 that is reciprocable within a bore of a guide sleeve 49 mounted in a hole defined by the cam cover 44. The plunger 42 is urged towards the summation lever 14 by the control spring 30. The roller 40 is intended to reduce the friction at the sliding contact between the plunger 42 and the summation lever 14 and may be replaced by a roller bearing on the end of the plunger 42 or by a friction bearing or an antifriction coating on the summation lever 14 or the end of the plunger 42.

In the embodiment of FIGS. 2 to 4, as in all embodiments of the present invention, there is no physical connection between the summation lever 14 or any part of the summation mechanism 13 and a point that is stationary relative to the engine. This simplifies assembly in that the summation mechanism 13 can be positioned between the cams 10, 12 and the valve 24 without its natural position being influenced by the control spring 30 or its guide system (i.e., plunger 42 and guide sleeve 49). The control spring 30 and the means for setting the clearance in the valve system can later be mounted on the engine and adjusted after the cam cover 44 has been secured to the engine block.

In the embodiment of FIGS. 2 to 4, the control spring 30 acts on the plunger 42. The stop that limits expansion of the control spring 30 is provided by a shoulder surface 46 on the plunger 42 that limits the expansion of the spring 30 when it contacts an abutment surface 48 defined by the top surface of the guide sleeve 49.

Operating clearance in this embodiment can be adjusted by correctly selecting or setting the length of the plunger 42. The plunger 42 of FIG. 3 is a graded part, with a distance L between the shoulder surface 46 and the end face 47 being graded. Alternatively, as shown in FIG. 4, a plunger 142 may be assembled to the required length using shims 51.

Throughout this description, to avoid unnecessary repetition, parts performing the same function have been allocated reference numerals with the same last two significant digits. Hence the plunger 142 of FIG. 4 serves the same function as the plunger 42 of FIGS. 2 and 3.

The embodiment of FIGS. 5 to 7 differs from that of FIGS. 2 to 4 in that the plunger 242 is an assembly that is adjustable in situ. An abutment shoulder 246 is threaded onto the stem of the plunger 242 and has a deformed thread form or other locking device. Instead of sliding within a guide, the plunger 242 slides directly in the cylinder head 249 or cam cover 44. The assembled plunger 242 is held captive in the cylinder head cover 44 by cap 250 that is bolted in place in the manner shown in FIG. 7. The cap 250 and the control spring 30 can thus be removed to access the adjustable length plunger 242.

The third embodiment of the present invention, shown in FIGS. 8 and 9 is similar in principle to the embodiment of FIG. 2 except that it uses a graded guide sleeve 349 fixed to the cylinder head in order to adjust the clearance of the system rather than varying the length of the plunger. The thickness of a collar at the upper end of the guide sleeve 349 is graded to set the clearance of the valve system. The guide sleeve 349 is designed to be easily exchanged for a guide sleeve with a different thickness of collar. A spring plate 360 (shown separately in FIG. 9) is used to hold the guide sleeve 349 in contact with its locating face in the cylinder head or cam cover. The guide sleeve 349 slides into a mounting bore in the cylinder head or cam cover and is locked in position with the spring plate 360 by turning it through a quarter turn. The guide sleeve 349 can be accessed by removing a cap 350, the control spring 30 and the plunger 342.

Alternative designs are possible for a graded abutment surface for the shoulder on the plunger. Instead of using a guide sleeve with a collar having a graded thickness, as shown in FIGS. 8 and 9, the plunger, as shown in FIG. 10, may slide directly in the cylinder head/cover. In this case, the abutment surface is defined by a flat graded plate 549 of graded thickness L that replaces the collared guide sleeve and essentially consists of the collar only without a sleeve lining the bore in the cam cover. Instead of a flat graded plate 549, it is also possible to use shims, as shown in FIG. 11, and to an enlarged scale in FIG. 12, to modify the position of the abutment surface for the shoulder 546 of the plunger 542. The flat graded plate 549 can still use a quarter-turn retention method using a spring clip, as shown in previous drawings.

The embodiment shown in FIGS. 13 to 15 uses an adjustable abutment surface position relative to the cylinder head or cam cover in order to adjust the clearance of the system. To simplify adjustment of the valve system clearance, all the components of the control spring and the means for setting the valve system clearance are combined into a single cartridge 670. The cartridge 670 has an outer casing 672 of which the upper end is connected to a cap 650 that acts as an abutment for the upper end of the control spring 630 and the lower end is connected to a sleeve 649 that is screw threaded into a hole formed in the cam cover or the cylinder head. A plunger 642 projects from bottom of the cartridge 670 and is urged downwards by the control spring 630.

After the cartridge 670 has been screwed into the cam cover or cylinder head, an oil seal 674 is used to seal the hole in the cam cover or cylinder head and a locking plate 676 is used to hold the cartridge in place and prevent it from turning. Clearance may be adjusted by rotating the cartridge so that its axial position changes.

An advantage of the proposed design compared to the prior art is its simpler assembly process. There is no longer a pivoting connection between the summation rocker and the control spring and guide system. The rocker system and camshaft can thus be fitted to the cylinder head and then the control spring can be assembled in a later assembly step.

The control spring system can be assembled from outside the cylinder head with the rest of the valve system fully assembled and able to turn.

A further advantage is that the assembly sequence offers the opportunity to measure the position of the summation rocker itself from outside the cylinder head, or allows the position of the control spring system to be measured from which the position of the rocker system can be inferred. The possible adjustment methods that this allows discussed in greater detail below.

System Adjustment Process

The graph in FIG. 16 illustrates the relationship between the valve lift characteristic and the motion of the controls spring plunger. It can be appreciated that the system motion can be inferred from measurement of the control spring plunger movement or measurement of the summation rocker contact surface position.

Measurements can be made before adjustment to define what adjustment needs to be made.

Measurements can be taken after adjustment to verify that the system has been adjusted correctly.

Measurements could also be taken on a fully assembled engine either on end of line testing or in service to verify correct operation of the valve system.

It can be appreciated that measuring the motion of the plunger offers some different parameters that can be used individually or in combination to set the optimum operating clearance:

1. Static Measurement

The camshaft can be set to a defined angle where cam follower roller 18 is on the base circle radius of cam lobe 12 and cam follower roller 16 is on the maximum radius of the profile of cam lobe 10. This is close to the position illustrated in the drawings.

Without a control spring fitted, the hydraulic lash adjusters would inflate to the point where both cam follower rollers 16, 18 contact their respective cam lobes 10, 12.

The distance of the roller 40 on the summation rocker below the plunger stop face can be measured, or the position of a "known" reference plunger can be measured from the plunger stop face.

The correct plunger length that will introduce the required clearance between cam follower roller 16 and its corresponding cam lobe 10 can then be calculated.

This method sets distance A in FIG. 16.

2. Plunger Movement Range over the Valve Lift Event

Plunger displacement can be measured over the valve lift in order to make an adjustment based upon the magnitude of the peak valve lift.

The displacement could be measured as the difference between two static measurements with the camshaft set at positions corresponding to the start and the end of the valve lift.

The displacement could also be derived from a measurement of plunger movement over one or more complete camshaft revolutions.

This method corresponds to a measurement of the displacement B in FIG. 16.

3. Dynamic Plunger Movement Characteristic

This method requires measurement of plunger position with camshaft angular position.

The ramp characteristic identified as C1 in FIG. 16 can be measured and the adjustment optimized to produce the correct ramp form C2 on the valve lift characteristic.

It should be appreciated that such dynamic position measurement data contains enough information to calculate movements A and B mentioned above, and that it would equally be possible to check that all of these measurements fall within a set of acceptance parameters while performing a detailed adjustment based on particular measurement readings.

Further Measurement Opportunities

The measurement(s) could be carried out at different points in the engine assembly and it would be possible to use the measured data to validate additional parameters as well as the valve system clearance.

Measurement could be done at the cylinder head sub-assembly stage before the cylinder head is assembled to the engine block.

Measurement from all cylinders could also check the timing of the valve events relative to the camshaft drive datum or camshaft gear/pulley.

Timing characteristics can be recorded in a coded mark or similar that can be used for refining the control parameters of the EMS.

Measurements could be taken at a motored engine test after assembly of the cylinder head to the engine block.

Measurements from all cylinders could be used to check the timing of the valve events relative to the crankshaft.

Timing characteristics can be recorded in a coded mark or similar that can be used for refining the control parameters of the Engine Management System (EMS).

Measurements could be taken at a fired or motored engine test after assembly of the full engine.

Measurements from all cylinders could be used to check the timing of the valve events relative to the crankshaft.

Software offsets can be applied directly to the EMS to optimize the timing of camshaft phasers etc.

Measurement of a camshaft timing feedback signal in combination with the plunger motion measurements would allow additional information about the valve system to be compensated for.

It is already common for fuel injectors to have their characteristics measured and recorded in a component dot matrix so that the EMS can optimize its control parameters to suit the actual components in the system. This approach could also be extended to valve systems, particularly if they are fitted with phasing systems that provide the ability to compensate for small angular variations.

The present invention is not limited to embodiments described herein; reference should be had to the appended claims.

What is claimed is:

1. A valve system for an engine which comprises an engine block, the valve system comprising:
   two cams which are coaxially mounted, each of the two cams comprising a follower;
   a summation lever coupled to each follower of the two cams, the summation lever being configured to perform a pivoting movement and to be movable in proportion to a sum of an instantaneous lift of each of the two cams;
   a hydraulic lash adjuster;
   a valve actuating rocker arranged to be pivotably coupled to the summation lever and to rest on the hydraulic lash adjuster, the valve actuating rocker being configured to operatively displace an engine valve in dependence upon a movement of the summation lever;
   a control spring configured to urge the summation lever in a direction to compress the hydraulic lash adjuster;
   a stop configured to limit an expansion of the control spring;
   a bore arranged to be stationary relative to the engine block;
   a plunger comprising a shoulder and an end, the plunger being arranged to reciprocate linearly within the bore; and
   an abutment surface arranged to be stationary relative to the engine block,
   wherein,
   the control spring is further configured to act on the summation lever via the plunger,
   the end of the plunger is arranged to be in a sliding engagement with the summation lever, a point of contact between the plunger and the summation lever being displaced in a direction transverse to an axis of the plunger during the pivoting movement of the summation lever,
   the shoulder of the plunger is arranged at a predetermined distance from the end of the plunger, and
   the shoulder of the plunger is configured to contact the abutment surface to limit a displacement of the plunger in a direction to compress the hydraulic lash adjuster.

2. The valve system as recited in claim 1, wherein a distance between the shoulder and the end of the plunger is adjustable to set a clearance in the valve system when the valve is closed and each respective follower is aligned with a base circle of its respective cam of the two cams.

3. The valve system as recited in claim 2, wherein,
   the plunger further comprises a cylindrical portion and a separate spring seat which is configured to position the shoulder, and
   a threaded engagement between the cylindrical portion and the separate spring seat is configured to alter an effective length of the plunger.

4. The valve system as recited in claim 1, wherein a position of the abutment surface is configured to be adjustable to set a clearance in the valve system when the engine valve is closed and each respective follower is aligned with a base circle of its respective cam of the two cams.

5. The valve system as recited in claim 1, wherein the actuating rocker comprises a roller bearing which is configured to engage the end of the plunger.

6. The valve system as recited in claim 1, further comprising:
   a cylinder head,
   wherein,
   the bore is machined in the cylinder head, and
   the plunger is further configured to reciprocate within the bore.

7. The valve system as recited in claim 6, wherein,
   the cylinder head comprises an additional component that forms the abutment surface, and
   the plunger is further configured to pass through the additional component located by the cylinder head.

8. The valve system as recited in claim 6, wherein,
   the cylinder head comprises a flanged stop collar and a flat surface,
   a position of the flanged stop collar in a direction of the axis of the plunger is limited by the flat surface, and
   the plunger is further configured to reciprocate within the flanged stop collar.

9. A method of adjusting a clearance of the valve system as recited in claim 1,
   wherein the valve system further comprises a camshaft, the method comprising:
   assembling the camshaft, the summation lever, and the valve actuating rocker of the valve system to the engine;
   taking one or more measurements of a linear position of the plunger in sliding engagement with the summation lever while the camshaft is rotated to one or more defined positions in order to determine an operating clearance of the valve system;
   setting a position of the stop to provide that the valve system has a correct operating clearance; and
   assembling remaining components, including the control spring.

10. The method as recited in claim 9, wherein the determination of the operating clearance and the setting of the operating clearance are each performed from an outside of a cylinder head.

11. A method of determining a clearance of the valve system as recited in claim 1,
    wherein the valve system further comprises a camshaft, the method comprising:
    rotating the camshaft into a position where one follower is aligned with a base circle of its respective cam, and the other follower is aligned with a maximum lift of its respective cam,
    measuring a first distance of the plunger from a reference point on the engine while applying a force to urge the plunger against the abutment surface;
    measuring a second distance from the reference point while allowing the hydraulic lash adjuster to take up a clearance in the system and raise the plunger off the abutment surface; and
    calculating a difference between the first distance and the second distance to determine the clearance of the valve system.

12. The method as recited in claim 11, further comprising:
    setting the clearance of the valve system by changing a position of a surface of the stop or a length of the plunger.

13. The method as recited in claim 12, wherein the determination of the clearance and the setting of the clearance are each performed from an outside of a cylinder head.

14. A method of determining a clearance of the valve system as recited in claim 1,
wherein the valve system further comprises a camshaft, the method comprising:
determining an angular position of the camshaft;
rotating the camshaft through 360° and measuring a distance to the plunger from a reference point on the engine;
determining a variation of the distance measured as a function of the angular position of the camshaft; and
determining, from the variation, a clearance between each follower and a base circle of the follower's respective cam.

15. The method as recited in claim 14, further comprising:
using a variation of the distance measured as a function of the angular position of the camshaft to determine a relative phasing of the two cams to each other and to a camshaft drive input.

16. The method as recited in claim 15, further comprising:
integrating the relative phasing of the two cams determined into a system identity mark or into a bar code so as to provide calibration information to an engine management system.

17. The method as recited in claim 14, further comprising;
setting the clearance of the valve system by changing a position of a surface of the stop or a length of the plunger.

18. The method as recited in claim 17, wherein the determination of the clearance and the setting of the clearance are each performed from an outside of a cylinder head.

* * * * *